United States Patent
Lamm et al.

[11] Patent Number: 6,100,657
[45] Date of Patent: Aug. 8, 2000

[54] ELECTRIC MOTOR DRIVE

[75] Inventors: Hubert Lamm, Kappelrodeck; Guenter Haderer, Buehl, both of Germany

[73] Assignee: Robert Bosch GmbH, Stuttgart, Germany

[21] Appl. No.: 09/075,204

[22] Filed: May 7, 1998

[30] Foreign Application Priority Data

May 16, 1997 [DE] Germany .......................... 197 20 690

[51] Int. Cl.[7] ...................................................... H02P 1/00
[52] U.S. Cl. ........................... 318/280; 318/445; 318/443; 318/444; 318/449; 318/466; 318/467; 318/468
[58] Field of Search ...................................... 318/280, 445, 318/443, 444, 449, 466, 467, 468; 381/86; 296/216

[56] References Cited

U.S. PATENT DOCUMENTS

| | | | |
|---|---|---|---|
| 5,080,492 | 1/1992 | Platzer, Jr. ............................... | 359/877 |
| 5,164,645 | 11/1992 | Takahisa et al. . | |
| 5,404,673 | 4/1995 | Toru et al. . | |
| 5,712,546 | 1/1998 | Holthouse et al. ...................... | 318/282 |
| 5,734,727 | 3/1998 | Flaherty et al. .......................... | 381/86 |
| 5,774,550 | 6/1998 | Brinkmeyer et al. ..................... | 380/21 |
| 5,864,989 | 2/1999 | Funatsu et al. ................................ | 52/1 |
| 5,872,436 | 2/1999 | Bergmann et al. ...................... | 318/286 |

Primary Examiner—Karen Masih
Attorney, Agent, or Firm—Kenyon & Kenyon

[57] ABSTRACT

An electric motor drive for an automotive operating element for moving between at least two end positions. A range about at least one selected position of the operating element is established. The drive automatically moves the operating element into the selected position when the automotive operating element has reached the established range.

13 Claims, 1 Drawing Sheet

ELECTRIC MOTOR DRIVE

FIELD OF THE INVENTION

The present invention relates to an electric motor drive for operating an automotive operating element.

BACKGROUND INFORMATION

Electric motor drives that are already known move operating elements in motor vehicles between, for example, end positions that are selected by an operating person. In order to cause such electric motor drives to move these operating elements, the operating person uses control commands that are delivered via an operating device. In particular, sliding electric sunroofs and sliding electric windows are electrically operated by pressing a toggle switch either in the direction of a completely open or a completely closed position, depending on the position of the switch. Furthermore, there are known electric motor seat adjusting mechanisms that can move a vehicle seat or parts thereof between end positions. It can happen that an operating person wants to move the operating element into a certain desired position, but the position is not reached exactly. This desired position may be, for example, the closed position of an automotive sunroof or sliding electric window or a certain seat position of an automobile seat. The operating person must therefore perform multiple adjustment operations until the operating element has assumed the desired position or must observe the operating element when positioning it to the desired position.

SUMMARY OF THE INVENTION

An object of the present invention is to ensure that certain preset, selected positions are assumed as selected positions by the operating element without the monitoring of an operating person.

In accordance with the electric motor drive of the present invention, the operating element assumes the selected position reliably as soon as the operating element is in an established area. This established area is referred to as the capture range. As a consequence, the driver is not diverted from observing street traffic by attempting to position the operating element accurately. In principle, several selected positions may also be defined for an operating element. The present invention is then applicable for each individually.

Whether the operating element is to be moved automatically into the selected position is advantageously dependent upon the direction of movement of the operating element before reaching the established area. This allows an operating person, by selecting the direction of movement, to also position the operating element in the capture range or out of the capture range without subsequent automatic movement of the operating element back into the selected position. The system for automatically moving the operating element is hereinafter referred to as the capture mechanism.

According to another embodiment of the present invention, when no control commands have been provided for the operating element by the operating person, the electric motor drive moves the operating element within the capture range automatically into the selected position. During the movement of the operating element on the basis of control commands issued by an operating person, however, the capture mechanism is not operational. The operating element can thus be moved through the capture range without the capture mechanism responding; however, if the operating element remains in the capture range, the drive moves the operating element into the selected position.

Another embodiment of the present invention provides that the selected position is an end position of the automotive operating element. This ensures advantageously that the end position will be assumed correctly even when the automotive operating element has been brought only into the vicinity of the end position.

For those automotive operating elements that release or close an opening, such as, for example, a sliding roof, there is the risk that the sliding roof might not assume the closed position accurately, because a toggle switch operating the drive of the sliding roof was released too soon. Due to wind guards or sealing lips at the edge of the sliding roof opening, it is often difficult for an operating person to recognize that the sliding roof is not yet in the closed position and that a complete closing and sealing effect has not been achieved. Therefore, damage that would otherwise be caused to the interior of the motor vehicle in this situation is prevented by the device according to the present invention.

Since the motor vehicle operating element can be moved into end positions, there is the danger of pinching body parts if the drive moves automatically into the selected position. The capture range is advantageously selected about the position so that pinching of a body part is ruled out. For example, if the selected position is set so that the automotive operating element comes to rest against a stop in the position, the capture range may be no larger than a few millimeters so that even children's body parts cannot be pinched.

According to another embodiment of the present invention, a device is provided to stop or reverse the drive outside the capture range in the event objects or body parts become pinched and to allow adjustment within the capture range. This rules out the possibility of pinching while at the same time ensuring the functionality of the capture mechanism, that is, the movement of the operating element to a fixed position on reaching the capture range.

Another implementation of the present invention is obtained when the drive has at least one speed sensor. The position of the operating element is related to the speed of the motor, so that the selected position and the capture range can be set as a function of the number of sensor pulses. However, position sensors that are, for example, in the form of loop potentiometers, may be arranged on the operating element itself.

Another embodiment of the present invention provides for the selected position and/or the selected range to be adjustable. This allows an operating person to adjust the response of the operating element to individual needs. For example, the operating person can set or clear different capture ranges or change their size.

It is also possible for the selected position and/or the indicated range to be learnable so that a closed position of the operating element, which may change in ongoing displacement operations due to wear or other influences, can be readjusted.

The present invention can be used preferably with sliding/lifting roofs, where the selected position may be the closed position. To implement the sliding and lifting function, such roofs are often equipped with a link guide that converts a linear adjusting movement into a displacement or lifting of the roof by means of a mechanical system. The selected position can be chosen so that it corresponds to the closed position of the sliding/lifting roof.

DETAILED DESCRIPTION

Figure 1:
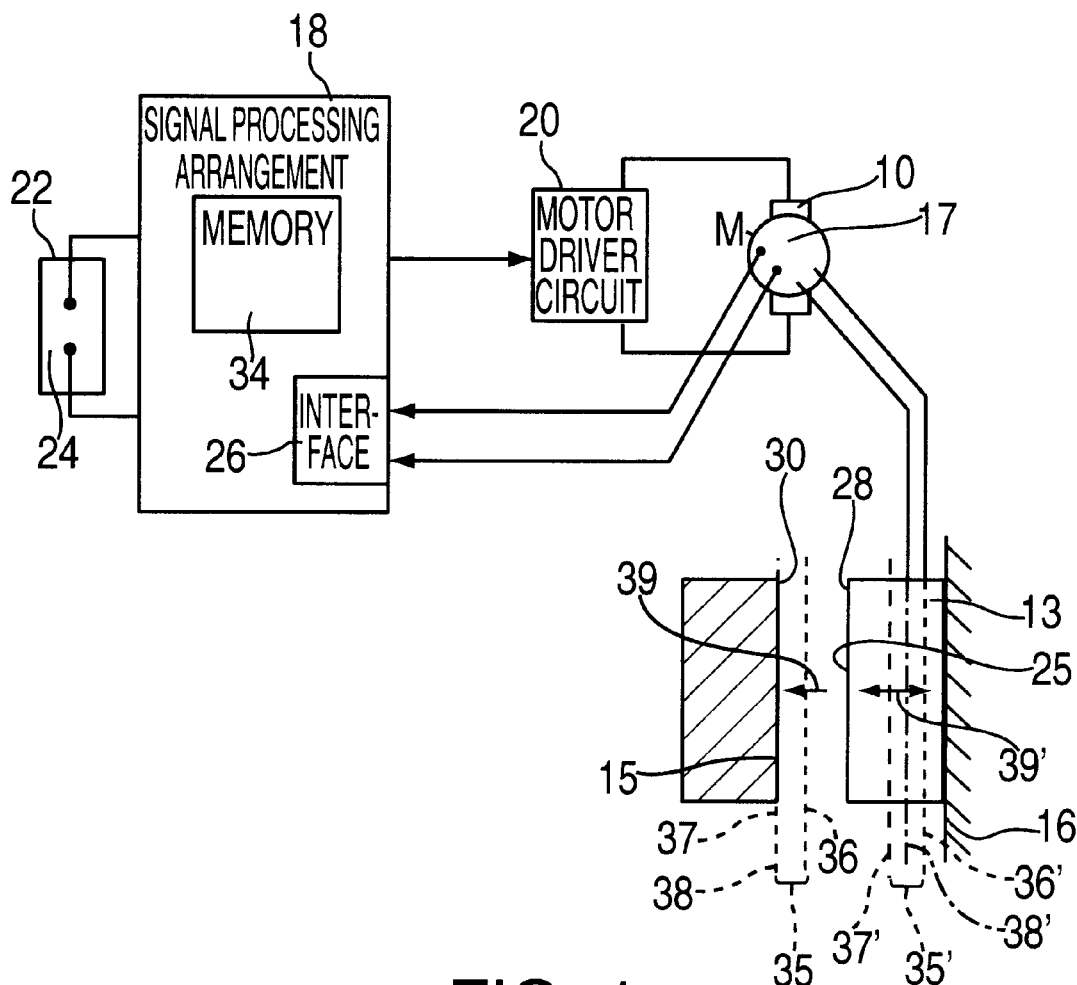
FIG. 1 shows a device according to the present invention for adjusting an automotive sliding roof.

FIG. 1 shows a first embodiment of the electric motor drive according to the present invention. An electric motor drive 10 moves an automotive operating element 13 between two end positions 15 and 16. The operating element 13 is an automotive sliding roof. Drive 10 has a signal processing arrangement 18 which regulates and controls drive 10 through a motor driver circuit 20. An operating device 22 in the form of a toggle switch 24 that can be switched in two directions about a neutral middle position transmits control commands of the motor vehicle driver to signal processing arrangement 18. One switching direction of the toggle switch 24 triggers a movement of operating element 13 in the direction of end position 15, while the other switching direction triggers a movement in the direction of end position 16. Two Hall sensors 17 arranged in the electric motor M of drive 10 work together with a magnet wheel on the motor armature shaft (not shown) as rotational sensors. The sensor signals produced by Hall sensors 17 are analyzed by signal processing arrangement 18 over an interface 26 to determine the rotational speed, the direction of rotation, and other motion parameters of the electric motor M. Signal-processing arrangement 18 determines the instantaneous position of operating element 13 from this data.

The electric motor drive 10 according to the present invention operates as follows: An operating person selects an adjustment of operating element 13 by operating toggle switch 24. Signal processing arrangement 18 causes drive 10 to move in the direction of one of the end positions 15 or 16 by means of motor driver circuit 20. The direction is determined by the position of toggle switch 24. During the movement of operating element 13, signal processing arrangement 18 enters the Hall sensor signals generated in drive 10 via interface 26 and determines the current position of operating element 13 from the incremented Hall sensor signals. For operating element 13, two selected positions 38, 38' representing certain specified positions for operating element 13 are entered in tables in a memory 34 of signal processing arrangement 18. Capture ranges 35, 35' in the form of lower limits 36, 36' and upper limits 37, 37' are established around the selected position 38, 38' and are also stored in memory 34 of signal processing arrangement 18. In addition, direction specifications 39, 39' are stipulated in memory 34 in the form of codes for the ranges. The codes represent a movement of the operating element 13 in the direction of end position 15, in the direction of end position 16, or in both directions. The position information is based on a reference point 25 on operating element 13, which is on the front edge of the sliding roof in this embodiment. If reference point 25 is above the lower limits 36, 36' and below the respective upper limits 37, 37' of one of capture ranges 35 or 35', then the sliding roof is in the capture range. If the operating person returns toggle switch 24 to its middle position, then signal processing arrangement 18 compares the current position of operating clement 13 with capture ranges 35, 35'.

If the operating element 13 has reached one of capture ranges 35, 35' at the end of operation of toggle switch 24, and if its direction of movement before the end of operation corresponds to direction specification 39 or 39' which is assigned to capture range 35 or 35', then signal processing arrangement 18 activates drive 10 over motor driver circuit 20 automatically until operating element 13 has assumed position 38 or 38' assigned to range 35 or 35'. Only then is the drive 10 and thus the operating element 13 stopped. This movement cannot be terminated by the operating person. This ensures that the selected position is assumed in every case. However, it is also possible to provide means to permit termination of the movement, for example, by a separate operating switch or by prolonged operation.

One of the selected positions stored in the memory 34 for operating element 13, that is, position 38, is the closed position of operating element 13, where front edge 28 of operating element 13 strikes against stop 30. Upper limit 37 of range 35, which is stipulated by selected position 38, coincides with the position of stop 30. The distance of the lower limit 36 from the upper limit 37 is selected so that drive 10 moves operating element 13 through range 35 with half a revolution of the driven element of its gear. Taking into account the given mechanical relationships, range 35 is so small that it is possible to reliably rule out any pinching of a person's body part between front edge 28 of operating element 13 and stop 30 as operating element 13 is automatically moved by signal processing arrangement 18. Secondly, by establishing the selected position 38, it is ensured that the sliding roof assumes the closed position when it is stopped near the closed position after a movement in the direction of stop 30. Damage to the interior of the vehicle due, for example, to water penetrating into it is prevented. Outside of established range 35, signal processing arrangement 18 stops or reverses control drive 10 in the event a person's body part or an object becomes pinched between operating element 13 and stop 30. To detect pinching, signal processing arrangement 18 analyzes the signals of Hall sensors 17 in drive 10. However, it is also conceivable to analyze the current consumed by the electric motor of drive 10.

The second selected position 38' is in the vicinity of the ventilation position of operating element 13, that is, in an area where the sliding roof is opened almost completely. Lower limit 36' and upper limit 37' of range 35' assigned to the selected position 38' are equidistant but in different directions from selected position 38'. If operating element 13 is in range 35' after the operator stops actuating toggle switch 24, then the signal processing arrangement 18 automatically moves operating element 13 into selected position 38'. In this case, the movement into selected position 38' is independent of the direction of the preceding movement of operating element 13. Selected position 38', for example, may be established so that the setting of the sliding roof in this position is especially favorable aerodynamically, or so that wind noise occurring in driving is especially attenuated. However, selected position 38' and/or range 35' about the selected position 38' may also be predetermined by the driver. The embodiment illustrated in FIG. 1 may also be used for adjusting a sliding electric window. In this embodiment, operating element 13 is a sliding electric window.

Figure 2:
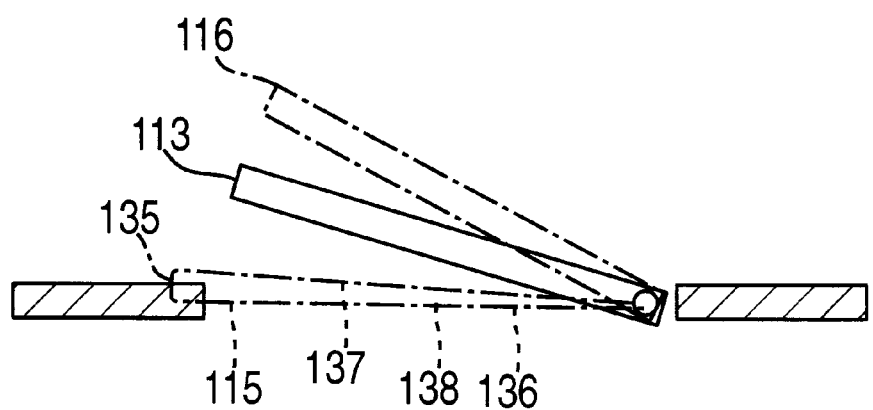
FIG. 2 shows a device according to the present invention for adjusting an automotive lifting roof.

FIG. 2 shows another embodiment of the present invention. An electric motor drive 10 moves an automotive lifting roof 113 between a closed position 115 and a ventilation position 116. Drive 10, signal processing arrangement 18 and operating device 22 for the automotive lifting roof are the same as in FIG. 1 and therefore are not shown here. End position 115 is entered in the memory 34 of the signal processing arrangement 18 as selected position 138. A range 135 is provided about selected position 138; lower limit 136 of range 135 coincides with selected position 138 and its upper limit 137 corresponds to a distance of lifting roof 113 from selected position 138. If, after conclusion of a displacement movement, operating element 113 is in range 135, the drive 10 automatically moves the operating element into selected position 138. This automatic movement takes place independently of the direction of the preceding movement. Here again, the size of range 135 is selected so as to prevent a person's body part from being pinched in the vehicle.

What is claimed is:

1. An electric motor drive for moving an automotive operating element between at least two end positions, comprising:

a drive device coupled to the operating element, wherein a range about at least one selected position of the operating element is established, the at least one selected position being preset, and wherein the drive device automatically moves the operating element into the at least one selected position when the operating element is in the established range.

2. The electric motor drive according to claim 1, wherein the automatic movement of the operating element into the at least one selected position is dependent on a direction of movement of the operating element before reaching the established range.

3. The electric motor drive according to claim 1, wherein, when the operating element is in the established range, the drive device moves the operating element into the at least one selected position in the absence of control commands for the operating element.

4. The electric motor drive according to claim 1, wherein one of the at least two end positions is an end position of the operating element, and wherein the end position of the operating element corresponds to the at least one selected position.

5. The electric motor drive according to claim 4, wherein the operating element is moveable within an open position and a closed position in at least one opening of an automobile, and wherein the end position of the operating element corresponds to the closed position of the operating element.

6. The electric motor drive according to claim 1, wherein the at least one selected position is a ventilation position of the operating element.

7. The electric motor drive according to claim 1, wherein the established range about the at least one selected position prevents any pinching of a body part of a person during the automatic movement of the operating element.

8. The electric motor drive according to claim 7, further comprising a signal processing arrangement, coupled to the drive device, for stopping and reversing the drive device in the event an object is pinched when the operating element lies outside the established range about the at least one selected position, and for allowing movement of the operating element inside the established range about the at least one selected position.

9. The electric motor drive according to claim 1, further comprising:

a signal processing arrangement coupled to the drive device;

an input device for relaying commands to the signal processing arrangement; and a plurality of sensors, coupled to the signal processing arrangement, for determining a position of the operating element, wherein the signal processing arrangement performs at least one of a controlling operation and a regulating operation of the drive device as a function of signals produced by the plurality of sensors.

10. The electric motor drive according to claim 9, further comprising an electric motor coupled to at least one of the plurality of sensors, and wherein each one of the plurality of sensors is a rotational speed sensor.

11. The electric motor drive according to claim 10, wherein each rotational speed sensor is a Hall sensor.

12. The electric motor drive according to claim 1, wherein at least one of the at least one selected position and the established range is adjustable.

13. The electric motor drive according to claim 1, wherein the operating element is one of a sliding roof, a lifting roof, and a window.

\* \* \* \* \*